US010303199B2

(12) United States Patent
Neubauer

(10) Patent No.: US 10,303,199 B2
(45) Date of Patent: May 28, 2019

(54) PEDAL DEVICE WITH DAMPING OF THE ACTUATION

(71) Applicant: AB ELEKTRONIK GMBH, Werne (DE)

(72) Inventor: Dirk Neubauer, Nachrodt-Wiblingwerde (DE)

(73) Assignee: AB ELEKTRONIK GMBH, Werne (DE)

( * ) Notice: Subject to any disclaimer, the term of this patent is extended or adjusted under 35 U.S.C. 154(b) by 0 days.

(21) Appl. No.: 15/753,114

(22) PCT Filed: Jul. 6, 2016

(86) PCT No.: PCT/EP2016/066040
§ 371 (c)(1),
(2) Date: Feb. 15, 2018

(87) PCT Pub. No.: WO2017/029023
PCT Pub. Date: Feb. 23, 2017

(65) Prior Publication Data
US 2018/0239389 A1 Aug. 23, 2018

(30) Foreign Application Priority Data
Aug. 18, 2015 (DE) .......................... 10 2015 113 679

(51) Int. Cl.
*G05G 5/05* (2006.01)
*G05G 5/03* (2008.04)
(Continued)

(52) U.S. Cl.
CPC ............. *G05G 5/05* (2013.01); *B60K 26/021* (2013.01); *G05G 1/44* (2013.01); *G05G 5/03* (2013.01)

(58) Field of Classification Search
CPC .. G05G 5/05; G05G 5/03; G05G 1/44; G05G 1/46; G05G 1/38; G05G 1/30; B60K 26/021; B60K 2026/023; B60T 7/04
See application file for complete search history.

(56) References Cited

U.S. PATENT DOCUMENTS 1,700,643 A * 1/1929 Nordell ................ G05G 1/30
251/243
6,070,490 A * 6/2000 Aschoff ................ B60K 26/02
74/513
(Continued)

FOREIGN PATENT DOCUMENTS

DE 4426549 2/1996
DE 10218627 11/2003
(Continued)

OTHER PUBLICATIONS

PCT International Preliminary Report on Patentability for corresponding PCT Application No. PCT/EP2016/066040, dated Feb. 20, 2018—6 pages.

*Primary Examiner* — Daniel D Yabut
(74) *Attorney, Agent, or Firm* — Dority & Manning, P.A.

(57) ABSTRACT

A pedal device is provided. For the actuation, a pedal element is deflectable in relation to a basic element. A bearing element is accommodated and rotatably mounted in at least one bearing shell on the basic element. The bearing element includes at least one first bearing sub-element and a second bearing sub-element which is movable in relation to the first bearing sub-element. The first bearing sub-element is connected to the pedal element. At least one resetting element acts on the second bearing sub-element. The first and second bearing sub-elements are arranged with respect to each other in such a manner that they are supported against each other at least one support point. When the pedal element is detected counter to the action of the
(Continued)

resetting element, an outwardly directed press-on force arises on the bearing sub-elements such that the latter are pressed onto the bearing shell.

14 Claims, 3 Drawing Sheets

(51) Int. Cl.
  *G05G 1/44* (2008.04)
  *B60K 26/02* (2006.01)

(56) References Cited

U.S. PATENT DOCUMENTS

| | | | | |
|---|---|---|---|---|
| 6,240,801 | B1* | 6/2001 | Kojima | B60K 26/021 267/155 |
| 6,250,176 | B1* | 6/2001 | Reimann | G05G 1/30 74/512 |
| 6,745,642 | B2* | 6/2004 | Kumamoto | B60K 26/021 74/512 |
| 7,051,615 | B2* | 5/2006 | Kumamoto | B60K 26/02 123/359 |
| 7,921,748 | B2* | 4/2011 | Kim | G05G 1/38 74/513 |
| 9,075,427 | B2* | 7/2015 | Muraji | B60K 26/021 |
| 2002/0152831 | A1* | 10/2002 | Sakamoto | G05G 1/30 74/512 |
| 2007/0240534 | A1* | 10/2007 | Makino | B60K 26/021 74/513 |
| 2011/0197700 | A1* | 8/2011 | O'Neill | G05G 1/30 74/512 |

FOREIGN PATENT DOCUMENTS

| | | |
|---|---|---|
| DE | 202006008453 | 3/2007 |
| DE | 102005059975 | 6/2007 |
| DE | 102010062370 | 6/2012 |
| EP | 1153785 | 11/2001 |

* cited by examiner

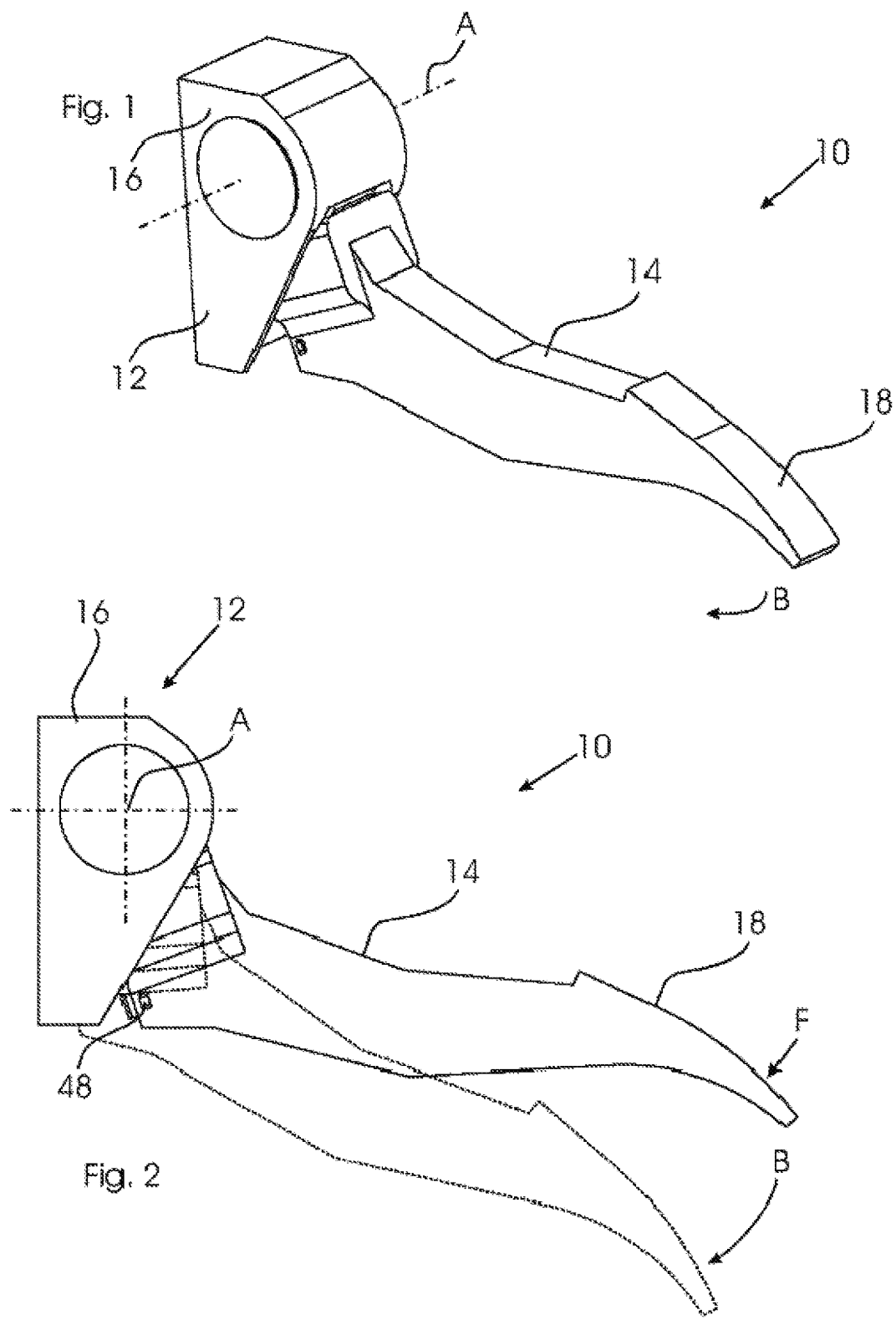

PEDAL DEVICE WITH DAMPING OF THE ACTUATION

PRIORITY CLAIM

The present application is a 371 of PCT/EP2016066040, filed on Jul. 6, 2016, which claims priority to German Application No. DE102015113679.1, filed on Aug. 18, 2015.

FIELD

The present disclosure relates to a pedal device.

BACKGROUND

Pedal devices serve as foot-actuated operating elements for controlling machines, in particular vehicles. A base element is customarily arranged fixedly here, for example in the footwell of the driver's seat of a motor vehicle, and, for actuation, a pedal element is deflectable, for example pivotable, in relation to the base element. For this purpose, the pedal element is mounted on the base element such that the deflection movement is made possible. A certain damping of the deflection movement is desirable here for precise operation.

DE 20 2006 008 453 U1 describes a gas pedal comprising a basic part and a pedal part which is pivotable in relation to the latter. A sensor lever is mounted pivotably on the basic part. A lug of the sensor lever is pressed against the pedal part by springs, and therefore said pedal part is always reset in the direction of an idling position. The sensor lever has two sleeve parts, between which an axle part is clamped. The clamping results in a defined desired friction between the sensor lever and the axle part, said friction being used for producing a movement hysteresis.

DE 10 2005 059 975 A1 describes a gas pedal for vehicles with a damping unit. The latter comprises a gripper unit with two gripper limbs and gripper claws. The gripper claws lie against a shaft element. One gripper limb is arranged on the pedal element and the other gripper limb on a pedal return unit. If a pedal force is applied, the latter together with a spring force of the pedal return unit brings about deformation of the gripper unit, and therefore the gripper claws are pressed against the shaft element and friction arises which damps the rotational movement about the shaft element.

DE 44 26 549 C2 discloses a gas pedal with a mounting base and a lever which is mounted pivotably on the latter and comprises a convex bearing part which is mounted rotatably in an open concave bearing point on the base. A rocker has a concave pressing part and an abutment and is mounted pivotably by means of a shaft. A compression spring is clamped between a driver cam on the bearing part and the abutment of the rocker, such that the concave pressing part of the rocker is pressed, with the convex bearing part of the lever being included, against the open, concave bearing point of the mounting base.

SUMMARY

Aspects and advantages of embodiments of the present disclosure will be set forth in part in the following description, or may be learned from the description, or may be learned through practice of the embodiments.

One example aspect of the present disclosure is directed to a pedal device. The pedal device includes a pedal element deflectable in relation to a base element. The pedal device includes a bearing element. The bearing element is accommodated and mounted rotatably in at least on bearing shell on the base element. The bearing element includes at least one first bearing sub-element and one second bearing sub-element. The second bearing sub-element is movable in relation to the first bearing sub-element. The first bearing sub-element is connected to the pedal element. At least one resetting element is provided for acting on the second bearing sub-element. The first and second bearing sub-elements are arranged with respect to each other such that the first and second bearing sub-elements are supported in relation to each other at least on supporting point. When the pedal element is deflected counter to the action of the resetting element, an outwardly directed pressure force arises on the first and second bearing sub-elements to force the first and second bearing sub-elements to be pressed against the bearing shell. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Embodiments of the invention are described in more detail below with reference to drawings, in which:

FIG. 1 shows a perspective view of a pedal device;

FIG. 2 shows a side view of the pedal device from FIG. 1 with an illustration of an idling position and of a full actuating position;

DETAILED DESCRIPTION

Figure 3:
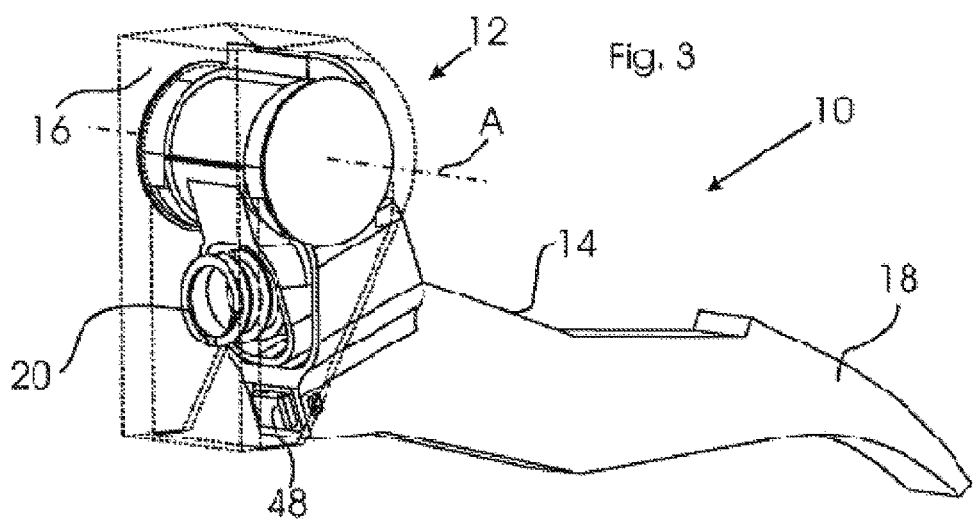
FIG. 3 shows a perspective illustration of the gas pedal device from FIGS. 1 and 2 with a housing illustrated partially transparently.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure propose a pedal device which, with as compact a construction as possible, permits secure mounting of the pedal element with damping of the deflection movement.

In some embodiments, the pedal device can include a base element, preferably for fixed arrangement, for example in the footwell of a motor vehicle. The pedal device can include a pedal element which is deflectable in relation to the base element. Examples of a pedal element are a pedal arm or a pedal plate. The deflection movement is preferably a pivoting movement.

A bearing element is provided in order to permit the deflection movement. The bearing element is connected to the pedal element and is accommodated and mounted rotatably in at least one bearing shell on the base element. In some embodiments, the bearing element includes at least one first and one second bearing sub-element. The first and the second bearing sub-elements are movable in relation to each other. The first and second bearing sub-elements can be separate elements. In some embodiments, the first bearing sub-element can also be formed integrally with the second bearing sub-element if the two bearing sub-elements are movable in relation to each other by means of a flexible portion.

In some embodiments, the first bearing sub-element is connected or coupled to the pedal element. This is understood as meaning a coupling, in which actuation of the pedal element, i.e. movement in relation to the base element, leads to rotation of the first bearing sub-element in the bearing shell. For example, the first bearing sub-element can be coupled rigidly to the pedal element.

In some embodiments, at least one resetting element is provided for acting on the second bearing sub-element. It can include, for example, a spring element and serves for applying a resetting setting force. The action on the second bearing sub-element can firstly be exerted here directly, for example by direct contact of the resetting element with the second bearing sub-element, or indirectly by contact of the resetting element with an element which is connected, particularly preferably coupled rigidly, to the second bearing sub-element.

In some embodiments, the first and the second bearing sub-element are arranged with respect to each other in such a manner that they are supported in relation to each other at least one supporting point. The arrangement is formed here in such a manner that, when the pedal element is deflected counter to the action of the resetting element, an outwardly directed pressure force arises on the bearing sub-elements, by means of which pressure force the bearing sub-elements are pressed against the bearing shell.

Upon an actuation, namely deflection, of the pedal element in the actuating direction, i.e. counter to the action of the resetting element, the bearing sub-elements are therefore pressed outward against the bearing shell. At the same time, a relative movement arises between the bearing sub-elements and the bearing shell at least partially surrounding the latter. The movement of the parts pressed onto each other results in increased bearing friction.

The friction damps the deflection movement. While it is possible in principle to provide additional damping elements, rather than needing separate devices of this type, the desired damping can already be obtained in the bearing.

A relatively large surface is available for this purpose in the case of the pedal device since the friction occurs between one or more outer surfaces of the bearing sub-elements and corresponding mating surfaces of the bearing shell. Relatively high frictional forces can thus be obtained with a simultaneously compact construction of the pedal device.

The outwardly directed pressure force on the bearing sub-elements is preferably obtained by spreading of the bearing sub-elements in relation to each other. During the actuating movement, at least parts of the bearing sub-elements jointly accommodated in the bearing shell spread and are then pressed outward against the bearing shell. In some embodiments, the bearing sub-elements can pivot in relation to each other at the supporting point, wherein very small movements are already sufficient in view of the close contact. A pivot axis can be defined by the supporting point and preferably lies parallel to the axis of rotation of the bearing element.

In some embodiments, the bearing sub-elements are mounted rotatably in the bearing shell. The first bearing sub-element is mounted rotatably about a first axis of rotation, and the second bearing sub-element is mounted rotatably about a second axis of rotation. The two axes of rotation can preferably coincide, and therefore the first and the second bearing sub-element are mounted in the bearing shell for rotation about a common axis of rotation.

The supporting point is preferably arranged here outside the first axis of rotation, the second axis of rotation and/or outside the common axis of rotation. Such an arrangement is particularly favorable in order to achieve spreading of the bearing sub-elements such that the desired pressure against the bearing shell can thereby be obtained.

In some embodiments, the first bearing sub-element is part of a pedal lever, i.e. a pivotable element which corresponds to the pedal element, is part of the pedal element or is connected to the latter. The second bearing sub-element forms a supporting lever, i.e. a second, pivotable lever. The pedal lever and the supporting lever are then pivotable in relation to each other at the supporting point. The pivoting of the pedal lever and supporting lever in relation to each other makes it possible to produce the pressure force with which the bearing sub-elements are pressed against the bearing shell.

The resetting element can be arranged in such a manner that the action thereof is opposed to the actuating direction of the pedal element. Without the effect of external forces, the pedal element can thus be reset into an idling position, from which the pedal element is deflectable in the actuating direction by an action of force, customarily as far as a full actuating position. In order to achieve this, the pedal element can preferably be coupled to the bearing element in such a manner that, when the pedal element is deflected in the actuating direction, rotation of the bearing element in a first direction of rotation arises, whereas the resetting element is arranged in such a manner that it acts upon the bearing element in a second direction of rotation opposed to the first direction of rotation. When the pedal element is actuated, two opposed forces or torques therefore act on the bearing element, namely the actuating force and the actuating moment, which act on the first bearing sub-element via the pedal element, and the resetting force of the resetting element, said resetting force acting directly or indirectly on the second bearing sub-element. The opposed forces or torques which act on the two bearing sub-elements of the bearing element can be used in order to obtain the desired, outwardly directed pressure forces and in particular to bring about the spreading of the bearing sub-elements relative to each other. Particularly preferably, a pivoting action of the two bearing sub-elements in relation to each other can thus be achieved at the supporting point, resulting in the outwardly directed pressure force.

Although the first bearing sub-element can be connected to the pedal element indirectly via various force transmission possibilities, such as a lever, etc., the pedal element can be fixedly connected to the first bearing sub-element. A particularly simple design can be obtained if the first bearing sub-element is even formed integrally with the pedal element.

The resetting element can include at least one spring. In order to permit a redundant configuration, at least two spring elements are preferred. The spring can be arranged acting between the base element and the second bearing sub-element. Different types of spring are possible, such as helical compression springs.

In some embodiments, the bearing element can substantially have a round cross section and can be arranged, for example, for its part in a cylindrical bearing shell. The division of the bearing element into the two bearing sub-elements can be in such a manner that the bearing sub-elements substantially each have partially circular, such as semicircular, cross sections. The supporting point is then formed between the bearing sub-elements.

The supporting point can be formed by a supporting element which protrudes from one of the bearing sub-elements and is accommodated in a pivot mounting on the other bearing sub-element. The pivot mounting can be formed by a depression.

When the bearing element is mounted in the bearing shell, the outer bearing surfaces of the bearing sub-elements and the inner bearing surface of the bearing shell can each be formed in the shape of a cylinder surface. A readily guided rotational movement of the bearing element about a central axis of rotation thus arises.

While the bearing shell may be configured to be axially continuous, it can be favorable if the bearing shell has two part shells which are arranged axially at a distance from each other. At least one of the part both part shells, can be as a bearing cover. The bearing shell can thus be particularly readily assembled and arranged around the bearing element.

FIG. 1 shows a gas pedal device 10 comprising a base element 12, which is intended for fixed arrangement in the footwell of a motor vehicle, and a pedal arm 14 which is deflectable in an actuating direction B about an axis A in relation to said base element 12 by way of a pivoting movement.

A resetting element 20, which will be explained in more detail below, is provided in a housing 16 of the base element 12. The action of the resetting element 20 causes the pedal arm 14 to be set back into the idling position, which is shown by solid lines in FIG. 2. Under the action of an actuating force F on a foot part 18 of the pedal lever 14, the latter can be deflected about the axis A in the actuating direction B counter to the action of the resetting element 20, as shown in FIG. 2. In a full actuating position (illustrated by dashed lines in FIG. 2), a stop limits the further pivoting movement of the pedal arm 14. A kick-down switch 48 becomes active beforehand and brings about a kick-down force peak which is to be overcome.

FIGS. 3-6 show the internal construction of the base element 12 and of the mounting of the pedal lever 14. The pivoting movement of the latter is guided, as is apparent in particular in the cross section of the bearings in FIG. 6 by way of the seating, which is rotatable about the axis of rotation A, of a bearing element 26 in a bearing shell formed by bearing covers 32, 34. The bearing element 26 is formed from a first bearing sub-element 22 and a second bearing sub-element 24.

Figure 4:
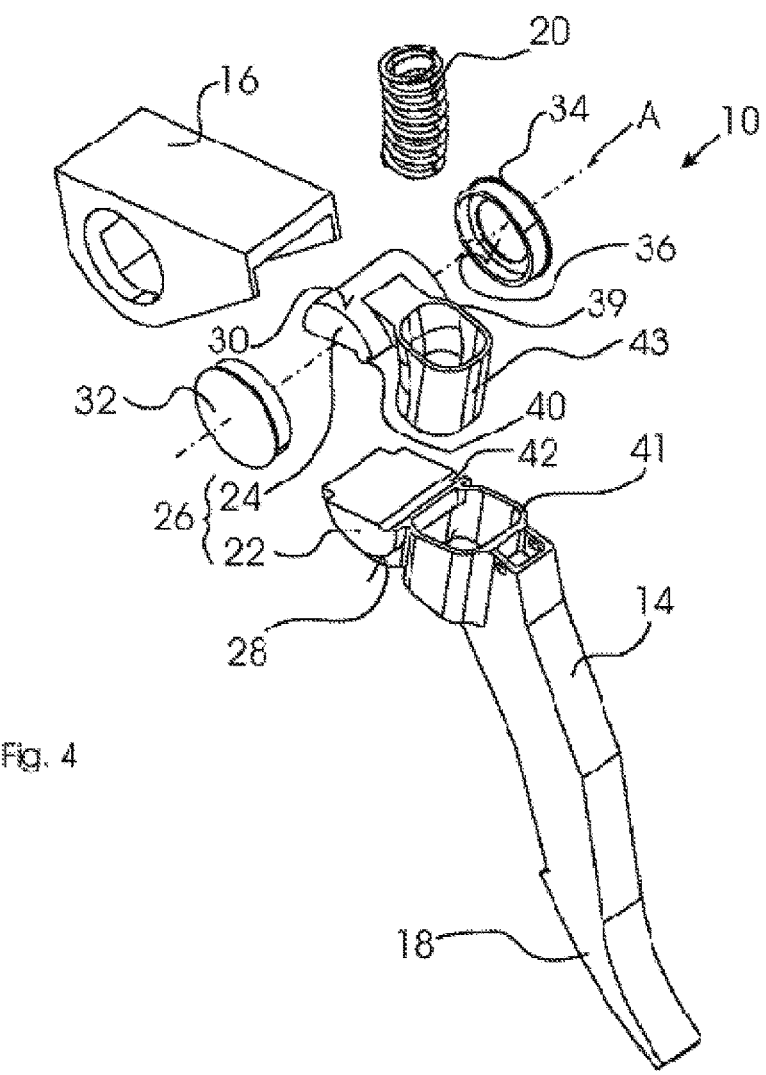
FIG. 4 shows a perspective exploded illustration of the gas pedal device from FIGS. 1-3.

As in particular the exploded illustration in FIG. 4 shows, the first bearing sub-element 22 is formed integrally with the pedal lever 14. In the fitted state (FIG. 5), the first bearing sub-element 22 lies next to the second bearing sub-element 24 and thus forms the bearing element 26.

The first and second bearing sub-elements 22, 24 each have outer contact surfaces 28, 30 which are in the shape of cylinder surfaces and with which said bearing sub-elements 22, 24 are accommodated in the bearing covers 32, 34 which have inner bearing surfaces 36 which match said contact surfaces 28, 30 and are in the shape of cylinder surfaces.

Figure 5:
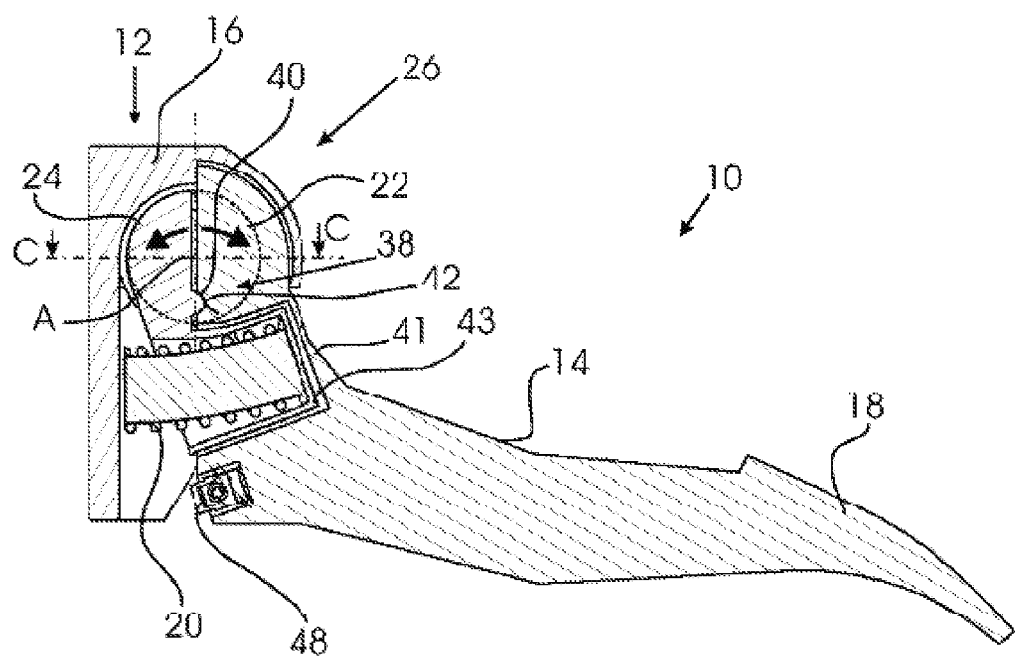
FIG. 5 shows a longitudinal section through the gas pedal device from FIGS. 1-4 along the line D-D in FIG. 6.

As is apparent in particular in the longitudinal section in FIG. 5, the bearing sub-elements 22, 24 each have an approximately semicircular design in cross section. The bearing sub-elements 22, 24 rest on each other and are supported here via a supporting point 38 which is formed by a rounded projection 40 on the second bearing sub-element 30, said projection 40 being accommodated in a rounded recess 42 on the first bearing sub-element 22.

A supporting lever 39 comprises a receptacle 43 for the resetting element 20 and for the bearing sub-element 24, formed integrally with said receptacle 43. The resetting element 20 which is in the form of a helical compression spring acts between the housing 16 of the base element 12 and the receptacle 43.

In order to form the bearing element 26, the supporting lever 39 and the pedal lever 14 are brought together in such a manner that the receptacle 43 for the resetting element 20 is accommodated in an enclosure 41, which is formed integrally with the pedal lever 14. In the fitted state, when the bearing element 26 is mounted rotatably about the axis A in the bearing covers 32, 34, the pedal lever 14 and the supporting lever 39 lie against each other only at the supporting point 38, while the enclosure 41 is arranged at a distance from the receptacle 43.

For each of the bearing sub-elements 22, 24, the contact of the outer surfaces 28, 30, which are in the shape of cylinder surfaces, of the bearing sub-elements 22, 24 against the inner surfaces 36, which are likewise in the shape of cylinder surfaces, of the bearing covers 32, 34 forms the guide required for the rotatable mounting.

In this manner, the pedal arm 14, which is coupled rigidly, namely formed integrally, with the first bearing sub-element 22, is mounted pivotably on the base element 12, wherein the action of the resetting element 20 between the housing 16 of the basic part 12 and the spring receptacle 43 brings about the resetting of the pedal arm 14 into the basic position.

This movement is damped by the bearing friction, i.e. by the friction of the outer surfaces 28, 30 of the bearing element 26 in relation to the inner surfaces 36 of the bearing covers 32, 34. This is reinforced during the actuation, i.e. when a force F acts on the foot element 18 of the pedal arm 14 in order to deflect the latter in the actuating direction B, by spreading of the bearing sub-elements 22, 24 in relation to each other.

The spreading action can be explained in particular with reference to the illustration in FIG. 5, in which the mounting in the bearing covers 32, 34 (not shown there) is illustrated by a dashed circle: as illustrated there, the bearing sub-elements 22, 24 are supported in relation to each other at the supporting point 38 which is arranged eccentrically, i.e. outside the pivot axis A. The supporting point 38 thus defines a pivot axis at which the bearing sub-elements 22, 24 and therefore also the lever formed integrally therewith, namely the pedal arm 14 and the supporting lever 39, are pivotable in relation to each other. The action of the resetting element 20 on the supporting lever 39 via the receptacle 43 brings about a torque on the second bearing sub-element 24, which is formed integrally with said receptacle 43, counter to the actuating direction B, i.e. counterclockwise in FIG. 5. By way of the actuating force F, a torque which is opposed to this torque acts on the pedal arm 14 and on the first bearing sub-element 22, which is formed integrally therewith. The bearing sub-elements 22, 24 are therefore acted upon in opposite directions.

Figure 6:
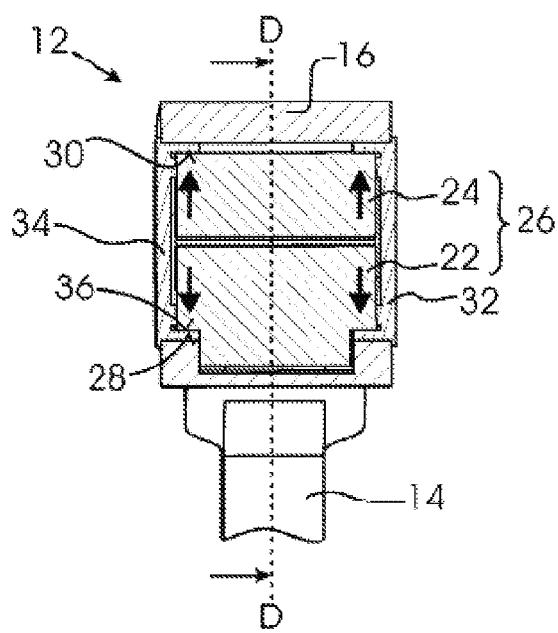
FIG. 6 shows a cross section through a mounting of the gas pedal device from FIGS. 1-5 along the line C-C in FIG. 5.

In this way, at the supporting point 38, a small pivoting movement of the bearing sub-elements 22, 24 in relation to each other occurs, and therefore so does a spreading apart of the two parts 22, 24 of the bearing element 26, as illustrated by arrows in FIGS. 5 and 6.

The spreading movement places the mounting under tension. Under the opposite action of the actuating force F and the force of the resetting element 20, the outer surfaces 28, 30 of the bearing sub-elements 22, 24 are therefore moved slightly apart and pressed against the bearing surfaces 36 of the bearing covers 32, 34. This results in greatly increased bearing friction.

Relatively large surfaces are available for the friction. Consequently, high pressure forces can act and, despite the very compact and simple construction, high frictional forces or frictional moments can be ultimately obtained.

The entire design of the described embodiment of a gas pedal is constructed extremely simply and with few parts, as is apparent from the illustrations. The gas pedal element can be rapidly and easily assembled by the resetting element 20 being inserted into the receptacle 43 and the two bearing sub-elements 22, 24 being arranged placed on each other in the housing 16 of the basic part 12. Form-fitting seating of the bearing element 26 is formed by lateral attaching of the bearing covers 32, 34.

During the operation of the gas pedal element 10, a sensor (not illustrated) can determine the current actuating position, i.e. the degree of the deflection in the actuating direction B, and provides this in the form of an electric signal in order, for example, to control the engine power. While various types of sensors may be used, in some embodiments, an inductive position sensor, in which a sensor switching circuit (not illustrated) is arranged on the housing 16 of the basic part 12 is used to determine the position of an inductive index element on the pedal arm 14.

The invention claimed is:

1. A pedal device, comprising:
   a pedal element deflectable in relation to a base element;
   a bearing element, the bearing element accommodated and mounted rotatably in at least one bearing shell on the base element, wherein the bearing element comprises at least one first bearing sub-element and one second bearing sub-element, the second bearing sub-element being movable in relation to the first bearing sub-element;
   wherein the first bearing sub-element is connected to the pedal element, at least one resetting element is provided for acting on the second bearing sub-element;
   wherein the first and second bearing sub-elements are arranged with respect to each other such that the first and second bearing sub-elements are supported in relation to each other at least one supporting point;
   wherein when the pedal element is deflected counter to the action of the resetting element, an outwardly directed pressure force arises on the first and second bearing sub-elements to force the first and bearing sub-elements to be pressed against the bearing shell; and
   wherein the first bearing sub-element is part of a pedal lever and the second bearing sub-element forms a supporting lever, wherein the pedal lever and the supporting lever are pivotable in relation to each other at the supporting point.

2. The pedal device of claim 1, wherein when the pedal element is deflected, the outwardly directed pressure force arises by spreading of the first and second bearing sub-elements in relation to each other.

3. The pedal device of claim 1, wherein the first bearing sub-element is mounted rotatably in the bearing shell about a first axis of rotation and the second bearing sub-element is mounted rotatably in the bearing shell about a second axis of rotation, wherein the supporting point is arranged outside the first and the second pivot axis.

4. The pedal device of claim 3, wherein first axis of rotation and the second axis of rotation are a common axis of rotation.

5. The pedal device of claim 1, wherein the pedal element is coupled to the bearing element such that when the pedal element is deflected in an actuating direction, the bearing element rotates in a first direction of rotation, wherein the resetting element is arranged such that the resetting element acts upon the bearing element in a second direction of rotation opposed to the first direction of rotation.

6. The pedal device of claim 1, wherein the pedal element is fixedly connected to the first bearing sub-element and is formed integrally therewith.

7. The pedal device of claim 1, wherein the resetting element comprises at least one spring which is arranged acting between the base element and the second bearing sub-element.

8. The pedal device of claim 1, wherein the bearing element has a substantially round cross section.

9. The pedal device of claim 8, wherein the first and second bearing sub-elements each have a partially circular cross section.

10. The pedal device of claim 1, wherein a supporting element which protrudes from the first bearing sub-elements and is accommodated in a pivot mounting on the second bearing sub-element at the supporting point.

11. The pedal device of claim 1, wherein the first and second bearing sub-elements each have cylinder surfaces as outer bearing surfaces.

12. The pedal device of claim 1, wherein the at least one bearing shell is formed annularly with at least one cylinder surface as an inner bearing surface.

13. The pedal device of claim 1, wherein the at least one bearing shell is a bearing cover placed on the base element.

14. The pedal device of claim 1, wherein the at least one bearing shell comprises at least two bearing shells which are arranged axially at a distance from each other and are each provided on the base element.

* * * * *